United States Patent
Deng

(10) Patent No.: US 7,693,152 B2
(45) Date of Patent: Apr. 6, 2010

(54) METHOD FOR ETHERNET DATA FRAME LEARNING AND FORWARDING, ETHERNET NETWORK AND BRIDGE

(75) Inventor: Zhusheng Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 11/771,201

(22) Filed: Jun. 29, 2007

(65) Prior Publication Data

US 2008/0008182 A1 Jan. 10, 2008

(30) Foreign Application Priority Data

Jul. 4, 2006 (CN) ........................ 2006 1 0098512

(51) Int. Cl.
*H04L 12/28* (2006.01)
(52) U.S. Cl. ..................................... 370/392
(58) Field of Classification Search ............... None
See application file for complete search history.

(56) References Cited

U.S. PATENT DOCUMENTS

| | | | | |
|---|---|---|---|---|
| 2004/0141468 | A1* | 7/2004 | Christensen et al. | 370/252 |
| 2004/0264458 | A1* | 12/2004 | Six | 370/389 |
| 2005/0027881 | A1 | 2/2005 | Figueira et al. | 709/238 |
| 2008/0205425 | A1* | 8/2008 | Vuppula et al. | 370/428 |

FOREIGN PATENT DOCUMENTS

| | | |
|---|---|---|
| CN | 1578252 | 2/2005 |
| EP | 1 492 268 | 12/2004 |
| WO | WO-03/101122 | 12/2003 |

OTHER PUBLICATIONS

Kurose et al., "Computer Networking. A Top-Down Approach Featuring the Internet," Addison Wesley, pp. 429-435 (2001).
European Search Report for Application No. 07013018.2-1244, dated Jan. 2, 2008.

(Continued)

*Primary Examiner*—Chirag G Shah
*Assistant Examiner*—Otis L Thompson, Jr.
(74) *Attorney, Agent, or Firm*—Finnegan, Henderson, Farabow, Garrett & Dunner LLP

(57) ABSTRACT

In an Ethernet network divided into multiple domains, a method for Ethernet data frame data learning includes: receiving through a bridge port of a domain of the Ethernet network an Ethernet data frame containing a source Media Access Control (MAC) address; and generating a forwarding matching entry including a destination MAC address, the length of a forwarding mask and a bridge egress-port identifier; wherein the destination MAC address is acquired by matching the source MAC address with the length of the forwarding mask. In a method for Ethernet data frame forwarding, a bridge forwards the Ethernet data frame according to a MAC forwarding matching table including a destination MAC address, the length of a forwarding mask and a bridge egress-port identifier. An Ethernet network and a bridge are also provided. The number of entries included in the MAC forwarding matching table o is reduced effectively.

21 Claims, 5 Drawing Sheets

OTHER PUBLICATIONS

IEEE Computer Society, "Media Access Control (MAC) Bridges," IEEE Standard for Local and Metropolitan Area Networks, 802.1D (2004).

IEEE Computer Society, "Virtual Bridged Local Area Networks," IEEE Standard for Local and Metropolitan Area Networks, STD802.1Q (2006).

IEEE Computer Society, "Virtual Bridged Local Area Networks—Amendment 4: Provider Bridges," IEEE Standard for Local and Metropolitan Area Networks, P802.1-ad/D6.0 (2005).

IEEE Computer Society, "Virtual Bridged Local Area Networks—Amendment 6: Provider Backbone Bridges," IEEE Standard for Local and Metropolitan Area Networks, P802.1ah/D3.3 (2006).

* cited by examiner

METHOD FOR ETHERNET DATA FRAME LEARNING AND FORWARDING, ETHERNET NETWORK AND BRIDGE

CROSS-REFERENCE TO RELATION APPLICATION

The priority benefit of Chinese Patent Application No. 200610098512.1, filed Jul. 4, 2006, the entire disclosure of which is hereby incorporated herein by reference, is claimed.

BACKGROUND OF THE INVENTION

1. Field of the Technology

The invention relates to Ethernet, and more particularly, to a method for Ethernet data frame learning and forwarding, an Ethernet network and a bridge.

2. Background of the Technology

A conventional Ethernet switch leans the network topology structure by analyzing source addresses of data frames from all networks connected with each other based on a mechanism of learning a source address in an Ethernet data frame and forwarding the Ethernet data frame according to a destination address. For example, a layer-2 switch receives through port 1 a data frame from host A and thus learns that host A is accessible through the network connected to port 1. By such a learning process, the layer-2 switch may establish a forwarding table. Table 1 is an example of the forwarding table.

TABLE 1

| Host Address | Port Number |
| --- | --- |
| 11.11.11.11.11.11 | 1 |
| 22.22.22.22.22.22 | 1 |
| 33.33.33.33.33.33 | 2 |
| 44.44.44.44.44.44 | 3 |

The layer-2 switch forwards the Ethernet data frame based on the forwarding table. When receiving the Ethernet data frame from one of the ports) the layer-2 switch searches the forwarding table according to the destination address in the Ethernet data frame. If there is a relationship between the destination address and a port of a network bridge in the forwarding table, the Ethernet data frame is forwarded through the port corresponding to the destination address. Otherwise, the Ethernet data frame is forwarded through all the other ports except the port through which the Ethernet data frame is received.

The conventional Ethernet switch is designed to be used in a Local Area Network (LAN). Because there is less client equipment in the LAN, less entries should be set in the Medium Access Control (MAC) forwarding table in the conventional Ethernet switch. However, when the Ethernet technique is introduced into the Metropolitan Area Network (MAN), it is difficult to use the conventional Ethernet technique because the MAC forwarding table has much more entries owing to a greater amount of client equipment, i.e., the scale of the MAC forwarding table is large. In order to solve the problem that the scale of the Ethernet forwarding table is large, the industry introduces such technique as the MAC stack (i.e. MAC in MAC) defined in IEEE 802.1ah. The main idea of the technique of the MAC stack is to add an operator Ethernet data frame header before an Ethernet data frame of a user entering the operator's network, learn and forward the Ethernet data frame in the operator's network according to the operator Ethernet data frame header.

FIG. 1 is a schematic diagram illustrating the relationship between the format of a conventional Ethernet data frame and the format of a MAC in MAC frame. As shown in FIG. 1, in the conventional Ethernet data frame, DA refers to the destination MAC address, SA refers to the source MAC address, Type/Length (T/L) is a field of type or length, Payload is a field of payload and CRC is cycle redundancy check. While in the MAC in MAC frame header, B-DA is the MAC address of destination Backbone Edge Bridge (BEB), B-SA is the MAC address of source BEB, B-TAG is a field with 4 bytes in the MAC in MAC encapsulation format for identifying the service tunnel of an operator's network, I-TAG is a field in the MAC in MAC encapsulation format for identifying different services of user in one service tunnel of an operator's network.

The whole conventional Ethernet data frame is mapped into the payload field in the MAC in MAC frame as the payload.

FIG. 2 is a schematic diagram illustrating the architecture of the MAC in MAC network. As shown in FIG. 2, Client Equipment (CE) is connected to the BEB of the MAC in MAC network of the operator, and there is also a Backbone Core Bridge (BCB) inside the MAC in MAC network. When an Ethernet data frame sent by the CE enters the BEB, the BEB encapsulates a MAC in MAC frame header shown in FIG. 1 into the Ethernet data frame. The BCB learns and forwards the Ethernet data frame according to the B-MAC in the MAC in MAC frame, i.e., according to the B-DA and the B-SA, and the user MAC is shielded from the BCB. When the Ethernet data frame is sent by a BEB to an external network, the MAC in MAC frame header is removed.

It can be seen from the above that, the bridges in the operator's network performs learning and/or forwarding according to the B-MAC of the BEB. Consequently, the scale of the MAC forwarding table inside the BCB is the number of the MAC addresses of the BEB and does not relate to the number of the MAC addresses of the CE. The capacity of the MAC forwarding table of the BCB is thus greatly reduced and the expansibility of the operator's network is improved as well. However, the capacity of the MAC forwarding table in the BEB is proportional to the number of the MAC addresses of the CE because the BEB needs to learn the relationship between the MAC addresses of the CE and the B-MAC. Such situation is not improved when compared with the conventional Ethernet bridge. Meanwhile, the complexity of processing the mapping from the MAC of the CE to the MAC in MAC network of the operator is increased. As described above, the technique of the MAC in MAC reduces the scale of the MAC forwarding table of the Ethernet bridge inside the operator's network. However, for the BEB, the scale of its forwarding table is equivalent to that of conventional Ethernet switch device, without any improvement.

SUMMARY OF THE INVENTION

According to an embodiment of the invention, a method for Ethernet data frame learning includes:

receiving, through a bridge port of a domain of an Ethernet network divided into multiple domains, an Ethernet data frame containing a source Media Access Control (MAC) address; and generating a forwarding matching entry including a destination MAC address, length of a forwarding mask and a bridge egress-port identifier; wherein the destination MAC address is acquired by matching the source MAC address with the length of the Forwarding mask.

According to an embodiment of the invention, a method for Ethernet data frame forwarding includes:

receiving, through a bridge port of a domain of an Ethernet network divided into multiple domains, an Ethernet data frame containing a destination MAC address:

acquiring a forwarding matching entry from a MAC forwarding matching table corresponding to the destination MAC address contained in the Ethernet data frame, wherein the forwarding matching entry includes a destination MAC address, length of a forwarding mask and a bridge egress-port identifier; and forwarding the Ethernet data frame through a bridge egress port indicated in the forwarding matching entry.

According to an embodiment of the invention, an Ethernet network includes multiple domains. Each of the multiple domains includes at least one bridge through which client equipment or other networks are connected to the Ethernet network, and the at least one bridge is configured for receiving through a bridge port of a domain of the Ethernet network an Ethernet data frame containing a source MAC address; and generating a forwarding matching entry including a destination MAC address, length of a forwarding mask and a bridge egress-port identifier, wherein the destination MAC address is acquired by matching the source MAC address with the length of the forwarding mask.

According to an embodiment of the invention, a bridge, in a domain of an Ethernet network including multiple domains, includes one or more components for receiving through a bridge port of the bridge an Ethernet data frame containing a source MAC address, and generating a forwarding matching entry including a destination MAC address, length of a forwarding mask and a bridge egress-port identifier; where the destination MAC address is acquired by matching the source MAC address with the length of the forwarding mask.

According to the embodiments of the present invention, the lumber of the entries included in the MAC forwarding matching table is reduced, i.e. the scale of the MAC forwarding matching table of each bridge is reduced. The technical scheme of the invention can be further cooperated with the MAC in MAC technique in the prior art, thus the scale of the MAC forwarding matching table of a BEB is reduced.

DETAILED DESCRIPTION OF THE PREFERRED EMBODIMENT

Embodiments of the invention are provided below.

The format of a MAC address according to an embodiment of the invention is designed as follows: the MAC address defined in the IEEE 802.3 is an unsigned binary number with 48 bits. The MAC address with all its bits as 1 is a broadcast address. The MAC address with the lowest bit of its first vector as 1 is a multicast address. The other MAC addresses are unicast addresses. In the Ethernet, equipment is identified by one unicast address uniquely.

The practical operator's Ethernet generally includes an access network and a convergence network. The access network serves to access the service of the user, and intercommunicates with other access networks through the convergence network or uplinks to the core network. According to an embodiment of the invention, the Ethernet can be divided, based on the access network and convergence network of the operator, into multiple network domains, and a domain address is allocated for each network domain. Each network domain includes one or more in-domain bridges, and an in-domain bridge address is allocated for each of the in-domain bridges. MAC addresses are allocated for other networks or CE connected to the in-domain bridges. As shown in Table 2, each MAC address includes a domain address corresponding to the domain where the CE or network belongs, a bridge address corresponding to an in-domain bridge connected to the CE or the network, and a client address for differentiating different CEs or networks. A MAC address may only include a domain address and a client address. The MAC address as shown in Table 2 is called a hierarchical MAC address, and is taken as an example for the description below.

TABLE 2

| Domain Address | Bridge Address | Client Address |
| --- | --- | --- |

In order to guarantee the compatibility, the hierarchical MAC address can be a unicast MAC address.

The method for Ethernet data frame learning and forwarding by each bridge in the Ethernet based on the hierarchical MAC address is described below.

Figure 1:
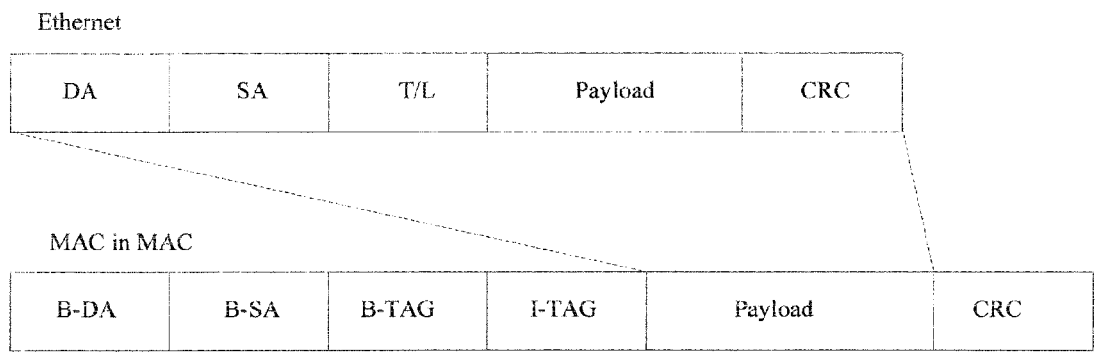
FIG. 1 is a schematic diagram illustrating the relationship between the format of a conventional Ethernet data frame and the format of the MAC in MAC frame.
Figure 2:
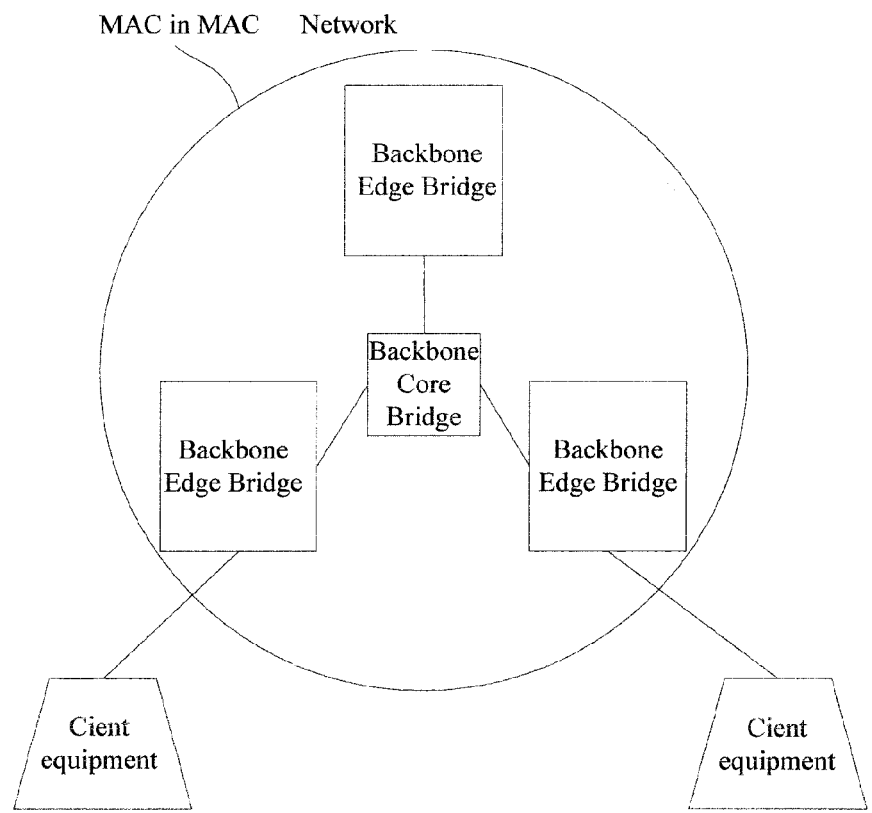
FIG. 2 is a schematic diagram illustrating the architecture of a conventional MAC in MAC network.
Figure 3:
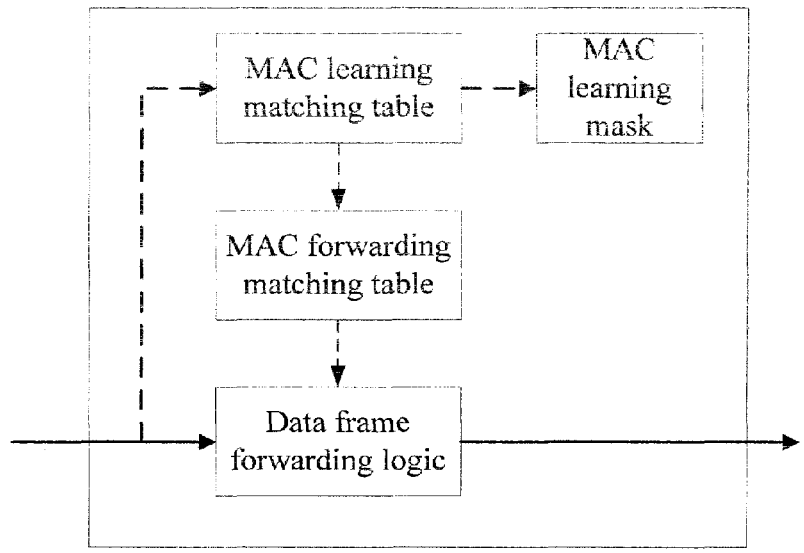
FIG. 3 is a schematic diagram illustrating the processing in a bridge according to the method in accordance with an embodiment of the invention.

As shown in FIG. 3, according to the context of each bridge in the network, the length of a MAC learning mask (called learning mask for short) is designated for each bridge and a MAC learning matching table corresponding to the length of the learning mask is configured for each bridge. When receiving an Ethernet data frame, the bridge, according to the length of the learning mask and the MAC learning matching table, learns the hierarchical source MAC address contained in the Ethernet data frame, acquires the length of a forwarding mask, generates a forwarding matching entry and stores the forwarding matching entry in a MAC forwarding matching table. An Ethernet data frame forwarding logic searches the MAC forwarding matching table for an entry corresponding to the hierarchical destination MAC address contained in the Ethernet data frame, and forwards the Ethernet data frame according to the entry.

In FIG. 3, the solid line refers to the path of the Ethernet data frame, while the dashed refers to the management relationship of internal learning and forwarding.

The structure of fields in the MAC learning matching table is shown in Table 3.

TABLE 3

| MAC Learning Matching Table ||
| --- | --- |
| Hierarchical Source MAC Address | The Length of a Forwarding Mask (bits) |

In Table 3, each row denotes an entry of the MAC learning matching table, including two columns, namely two fields. The hierarchical source MAC address in Table 3 is used for matching with the hierarchical source MAC address contained in the Ethernet data frame. The length of the forwarding mask is the length of the forwarding mask of the forwarding matching entry generated in the MAC forwarding matching table corresponding to the hierarchical source MAC address. Only one MAC learning mask is configured for one bridge and a default learning matching entry may be configured in the MAC learning matching table so as to avoid configuring a learning matching entry for each possible hierarchical MAC address of the Ethernet data frame through the bridge.

Another structure of fields in the MAC learning matching table is shown in Table 4, in which the length of the learning mask is configured for each hierarchical source MAC address.

TABLE 4

MAC Learning Matching Table

| Hierarchical Source MAC Address | Length of a Learning Mask (bits) | Length of a Forwarding Mask (bits) |
|---|---|---|

According to Table 4, the flexibility of learning the hierarchical source MAC address is improved, however, the complexity is also increased. The following description is given based on the manner of configuring a learning mask for a bridge, i.e., each bridge is configured with one learning mask.

The structure of the MAC forwarding matching table is shown in Table 5.

TABLE 5

MAC Forwarding Matching Table

| Hierarchical Destination MAC Address | Length of a Forwarding Mask (bits) | Egress-port Identifier |
|---|---|---|

In Table 5, each row of the forwarding matching entry includes three columns, namely, three fields. The hierarchical destination MAC address and the length of the forwarding mask are used to match the destination MAC address in the Ethernet data frame. The egress-port identifier denotes the port through which the Ethernet data frame matching with the forwarding matching entry is sent.

Examples are taken to describe the process of learning and forwarding. Assuming that the length of the learning mask designated to a bridge is 32 bits, the MAC learning matching table is configured as shown in Table 6.

TABLE 6

MAC Learning Matching Table

| Hierarchical Source MAC Address | Length of the Forwarding Mask (bits) |
|---|---|
| 0.2.0.1.0.0 | 48 |
| Default | 16 |

The process of learning is described below.

When receiving from port p1 an Ethernet data frame with the hierarchical source MAC address 0.2.0.1.1.1, the bridge acquires the first 32 bits (i.e., the length of the MAC learning mask of the hierarchical source MAC address), and matches the length of the MAC learning mask with the MAC learning matching table. The learning matching entry matching with the length of the MAC learning mask is [0.2.0.1.0.0, 48], that is, the length of the forwarding mask is 48 bits. The forwarding matching entry [0.2.0.1.1.1, 48, p1] is thus generated for the MAC forwarding matching table.

When receiving from port p2 all Ethernet data frame with the hierarchical source MAC address 0.3.0.1.1.1, the bridge acquires the first 32 bits of the hierarchical source MAC address and matches the first 32 bits with the MAC learning matching table. The matching learning matching entry is [default, 16], that is, the length of the forwarding mask is 16 bits. The forwarding matching entry [0.3.0.0.0.0, 16, p2] is thus generated for the MAC forwarding matching table.

The MAC forwarding matching table generated in the bridge is shown in Table 7.

TABLE 7

MAC Forwarding Matching Table

| Destination MAC Address | Length of the Forwarding Mask (bits) | Egress-port |
|---|---|---|
| 0.2.0.1.1.1 | 48 | p1 |
| 0.3.0.0.0.0 | 16 | p2 |

The process of forwarding is described below.

When receiving from port p1 an Ethernet data frame with the hierarchical destination MAC address 0.3.0.1.1.1, the bridge, according to the MAC forwarding matching table, acquires a matching forwarding matching entry [0.3.0.0.0.0, 16, p2] because the first 16 bits of 0.3.0.1.1.1 are equal to 0.3.0.0.0.0, thus the egress-port is p2. The Ethernet data frame is forwarded through port p2.

Additionally, the method mentioned above in the embodiments of the invention may be also applied in the MAC in MAC network with a column of the B-MAC added into the entry, and the process is similar to that mentioned above.

It can be seen from the above that, in the hierarchical MAC address in accordance with the embodiments of the invention, different MAC bytes respectively represent the domain where the CE or the other networks belong, the associated bridge and different clients. Accordingly, when the length of the learning mask of each bridge is designated and the MAC learning matching table of each bridge is configured, the configuration can be implemented flexibly according to the context of different bridges in the network. Thus, the length of the forwarding mask corresponding to each destination address in the MAC forwarding matching table of the bridge is less than the whole length of the MAC bytes (48 bits). Therefore, the matching is successful if the higher-bit bytes of multiple hierarchical MAC address are the same with the higher-bit bytes of the hierarchical destination MAC address stored in the MAC forwarding matching table, where the length of the higher-bit bytes is equal to the length of the forwarding mask in the MAC forwarding matching table. Then data forwarding or data transmitting can be performed based on the matching forwarding matching entry, that is, multiple hierarchical destination MAC addresses share one forwarding matching entry in the MAC forwarding matching table, but not have corresponding forwarding matching entries in the MAC forwarding matching table respectively.

Embodiments of the invention are described in detail on basis of an exemplary network.

Figure 4:
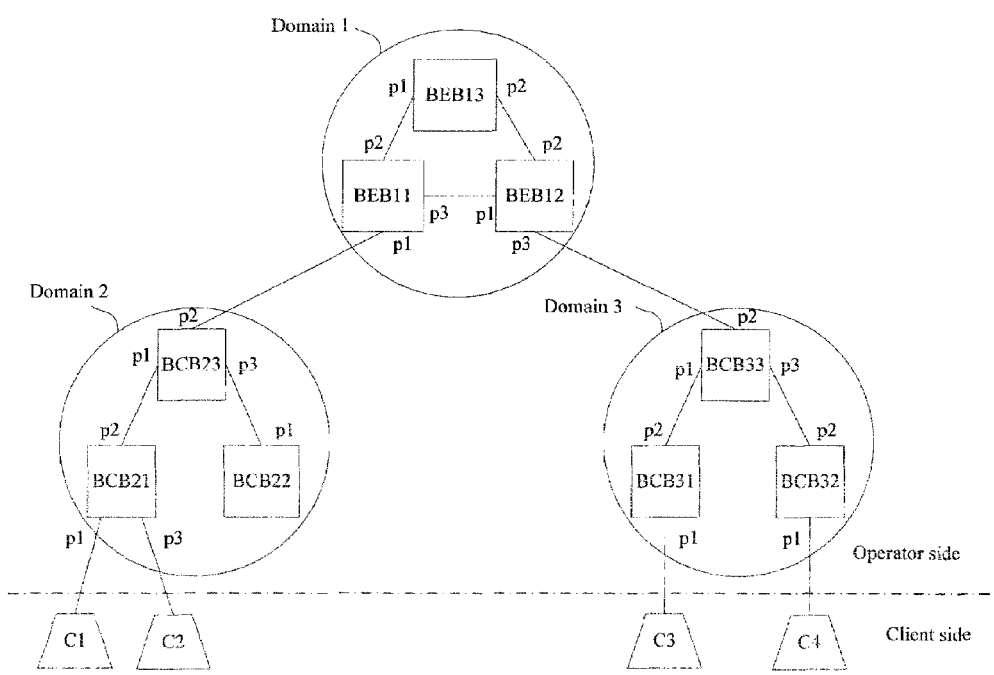
FIG. 4 is a schematic diagram illustrating the structure of an Ethernet network in accordance with an embodiment of the invention.

As shown in FIG. 4, the Ethernet is divided into three network domains: domain 1, domain 2, and domain 3. Domains 2 and 3 are access networks for accessing the services of the users. Domain 1 is a convergence network for inter-communicating the data between domain 2 and domain 3. C1, C2, C3 and C4 are client equipments of the Ethernet.

There is one or more bridges in each domain. BCB21, BCB22, BCB31, and BCB32 are access bridges at the client side and provide the access functions for the services of the users. BCB23, BCB33, BEB11, BEB12 and BEB13 are inter-domain bridges. BCB may be the bridge of the Ethernet such as IEEE 802.1d/.1q/.1ad and so on. Or, the BEB may be a peripheral Ethernet bridge of MAC in MAC provider of IEEE802.1 ah.

With respect to the two-level network illustrated in FIG. 4, an applicable hierarchical MAC format is shown in Table 8.

TABLE 8

Hierarchical MAC Format

| Meanings of Field | Domain Address | Bridge Number of the client side | Client Equipment Number |
|---|---|---|---|
| Length (bytes) | 2 | 2 | 2 |

In Table 8, the domain address refers to the network domain of the operator for accessing the services of the users. The bridge number of the client side refers to the bridge of the operator for accessing the services of the users, and a bridge number in a network domain may be the same as a bridge number in another network domain. The Client Equipment number identifies different client equipment accessed by the bridge of the client side. A Client Equipment number corresponding to a bridge of the client side may be the same as a Client Equipment n-umber corresponding to another bridge of the client side.

On the basis of the rules above, the resources allocation for the domain address, the bridge number of the client side and client equipment number of the hierarchical network shown in FIG. 4 are illustrated in Table 9, Table 10 and Table 11 respectively.

TABLE 9

Domain Address Allocation Table

| Domain | Domain Address |
|---|---|
| Domain 1 | 0x01 |
| Domain 2 | 0x02 |
| Domain 3 | 0x03 |

TABLE 10

Allocation Table of Bridge Number of the Client Side in a Network Domain

| Bridge of the client side | Allocated Number |
|---|---|
| BCB21 | 0x01 |
| BCB22 | 0x02 |
| BCB31 | 0x01 |
| BCB32 | 0x02 |

TABLE 11

Client Equipment Number Allocation Table

| Client Equipment | Allocated Number |
|---|---|
| C1 | 0x01 |
| C2 | 0x02 |
| C3 | 0x01 |
| C4 | 0x02 |

In addition, the learning mask and the MAC learning matching table for each bridge are configured so as to effectively use the information in the hierarchical MAC format.

Because bridges BEB11 and BEB12 in domain 1 can forward the Ethernet data frame of the user according to the information of the domain address in the hierarchical MAC format, the length of learning masks of both BEB11 and BEB12 and the length of forwarding masks of both BEB11 and BEB12 may be set as 16 bits. The MAC learning matching table of both BEB11 and BEB12 is shown in table 12.

TABLE 12

BEB11&BEB12 Learning Matching Table

| Hierarchical Source MAC Address | Length of a Forwarding Mask (bits) |
|---|---|
| Default | 16 |

With respect to bridge BCB21 in domain 2, it can recognize, according to the whole MAC address with 48 bits, the forwarding path of the in-domain Ethernet data frame of the user received from a port. Consequently, if the hierarchical source MAC address is the domain address of domain 2, the length of the forwarding mask corresponding to the hierarchical source MAC address is 48 bits. While the Ethernet data frame of the user sent to domain 3 may be forwarded according to a 16-bit domain address, the length of the learning mask of BCB21 may be designated as 16 bits. The length of the forwarding mask corresponding to the default hierarchical source MAC address is 16 bits. The MAC learning matching table configured for BCB21 is shown in Table 13.

TABLE 13

BCB21 MAC Learning Matching Table

| Hierarchical Source MAC Address | Length of a Forwarding Mask (bits) |
|---|---|
| 0.2.0.0.0.0 | 48 |
| Default | 16 |

Similarly, the MAC learning matching table configured for BCB31 in domain 3 is shown in Table 14.

TABLE 14

BCB31 MAC Learning Matching Table

| Hierarchical Source MAC Address | Length of a Forwarding Mask (bits) |
|---|---|
| 0.3.0.0.0.0 | 48 |
| Default | 16 |

Bridge BCB23 in domain 2 recognizes the forwarding path of an in-domain Ethernet data frame of the user according to 32-bit domain address plus a bridge number. Consequently, the length of the forwarding mask corresponding to bridge BCB23 is 32 bits. While the Ethernet data frame of the user sent to domain 3 may be forwarded according to the 16-bit domain address, the length of the learning mask of BCB23 may be designated as 16 bits. The MAC learning matching table configured for BCB23 is shown in Table 15. Similarly, the MAC learning matching table configured for BCB33 in domain 3 is shown in Table 16.

TABLE 15

BCB23 MAC Learning Matching Table

| Hierarchical Source MAC Address | Length of a Forwarding Mask (bits) |
|---|---|
| 0.2.0.0.0.0 | 32 |
| Default | 16 |

TABLE 16

BCB33 MAC Learning Matching Table

| Hierarchical Source MAC Address | Length of a Forwarding Mask (bits) |
|---|---|
| 0.3.0.0.0.0 | 32 |
| Default | 16 |

Figure 5:
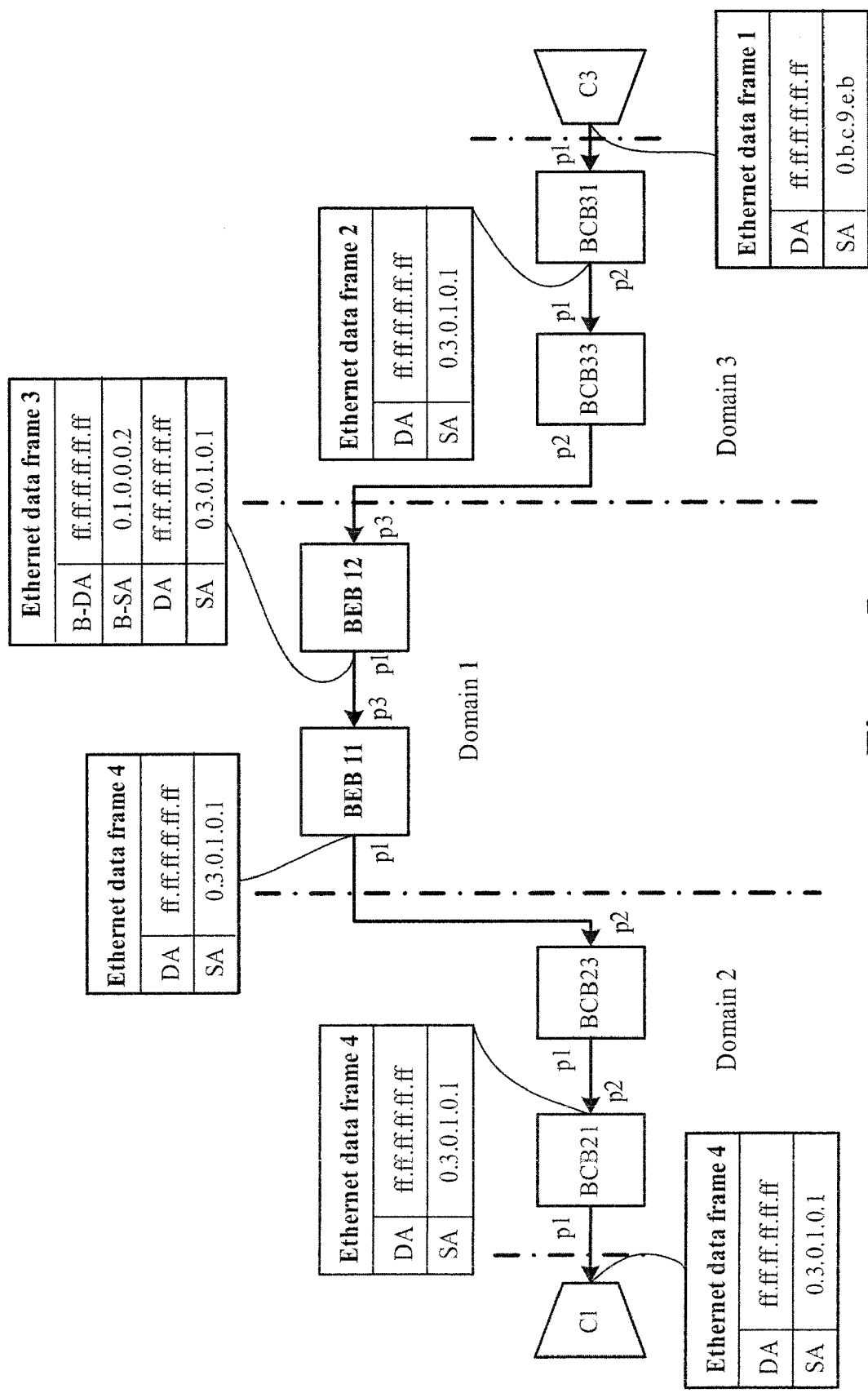
FIG. 5 is a schematic diagram illustrating the process of processing data frame sent by C3 to C1 in the Ethernet network shown in FIG. 4.

Assuming that the conventional MAC address of client equipment C1 is 0.d.b.c.a.8, and the conventional MAC address of client equipment C3 is 0.b.c.9.e.b. The B-MAC of BEB11 is 0.1.0.0.0.1 and that of BEB12 is 0.1.0.0.0.2. Client equipment C3 sends a broadcast Ethernet data frame 1, and all bits of the destination MAC address of broadcast Ethernet data frame 1 are F. FIG. 5 is a schematic diagram illustrating the process of forwarding the Ethernet data frame. As shown in FIG. 5, the process is described below.

Upon receiving, through port p1, a broadcast Ethernet data frame 1 sent by client equipment C3, BCB31 replaces the conventional source MAC address in the broadcast Ethernet data frame 1 by a hierarchical MAC address such as 0.3.0.1.0.1 according to the allocation resources configured in advance, thus a new Ethernet data frame 2 is established and a reverse MAC mapping table [0.3.0.1.0.1, 0.b.c.9.e.b] is also established as shown in Table 17.

TABLE 17

BCB31 Reverse MAC Mapping Table

| Hierarchical Destination MAC Address | Converted Conventional MAC Address |
|---|---|
| 0.3.0.1.0.1 | 0.b.c.9.e.b |

BCB31 learns the hierarchical source MAC address of the Ethernet data frame 2 based on the BCB31 MAC learning matching table. Because the first 16 bits of 0.3.0.1.0.1 matches best with the learning matching entry [0.3.0.0.0.0, 48] in the BCB31 MAC learning matching table, the forwarding matching mask is 48 bits, and thus an forwarding matching entry [0.3.0.1.0.1, 48, p1] is generated in the MAC forwarding matching table. BCB31 sends the Ethernet data frame 2 through port p2.

Upon receiving the Ethernet data frame 2 through port p1, BCB33 learns the hierarchical source MAC address based on the BCB33 MAC learning matching table. Because the first 16 bits of 0.3.0.1.0.1 matches best with the learning matching entry [0.3.0.0.0.0, 32], the forwarding matching mask is 32 bits, and a forwarding matching entry [0.3.0.1.0.0, 32, p1.] in the MAC forwarding matching table is generated. BCB33 sends the Ethernet data frame 2 through port p2. In the forwarding matching entry generated, 0.3.0.1.0.0 refers to the destination MAC address. Because the length of the forwarding mask is 32 bits, the first 4 bytes at higher bits of the destination MAC address are identical to that of the hierarchical source MAC address 0.3.0.1.0.1, and the last two bytes at lower bits are set as 0.

Upon receiving the Ethernet data frame 2 through port p3, BEB12 learns the hierarchical source MAC address based on the BEB12 MAC learning matching table. The hierarchical source MAC address 0.3.0.1.0.1 matches with the default, thus the forwarding matching mask is 16 bits, and a forwarding matching entry [0.3.0.0.0.0, 16, N/A, p3] is generated in the MAC forwarding matching table. N/A in the forwarding matching entry means no MAC in MAC frame header is included. BEB12 adds the MAC in MAC frame header to the Ethernet data frame 2, generates and sends an Ethernet data frame 3 through port p1.

Upon receiving the Ethernet data frame 3 through port p3, BEB11 learns the hierarchical source MAC address based on the BEB11 MAC learning matching table. Hierarchical source MAC address 0.3.0.1.0.1 matches with the default and the forwarding matching mask is 16 bits, thus a forwarding matching entry [0.3.0.0.0.0, 16, 0.1.0.0.0.2, p3] is generated in the MAC forwarding matching table. 0.1.0.0.0.2 in the forwarding matching entry refers to the hierarchical MAC address of BEB12. BEB11 removes the MAC in MAC frame header from the Ethernet data frame 3, generates and sends an Ethernet data frame 4 through port p1.

Upon receiving the Ethernet data frame 4 through port p2, BCB23, learns the hierarchical source MAC address based on the BCB23 MAC learning matching table. Hierarchical source MAC address 0.3.0.1.0.1 matches with the default and the forwarding matching mask is 16 bits, thus a forwarding matching entry [0.3.0.0.0.0, 16, p2] is generated in the MAC forwarding matching table. BCB23 sends the Ethernet data frame 4 through port p1.

Upon receiving the Ethernet data frame 4 through port p2, BCB21 learns the hierarchical source MAC address based on the BCB21 MAC learning matching table. Hierarchical source MAC address 0.3.0.1.0.1 matches with the default and the forwarding matching mask is 16 bits, thus a forwarding matching entry [0.3.0.0.0.0, 16, p2] is generated in the MAC forwarding matching table. BCB21 sends the Ethernet data frame 4 through port p1.

Figure 6:
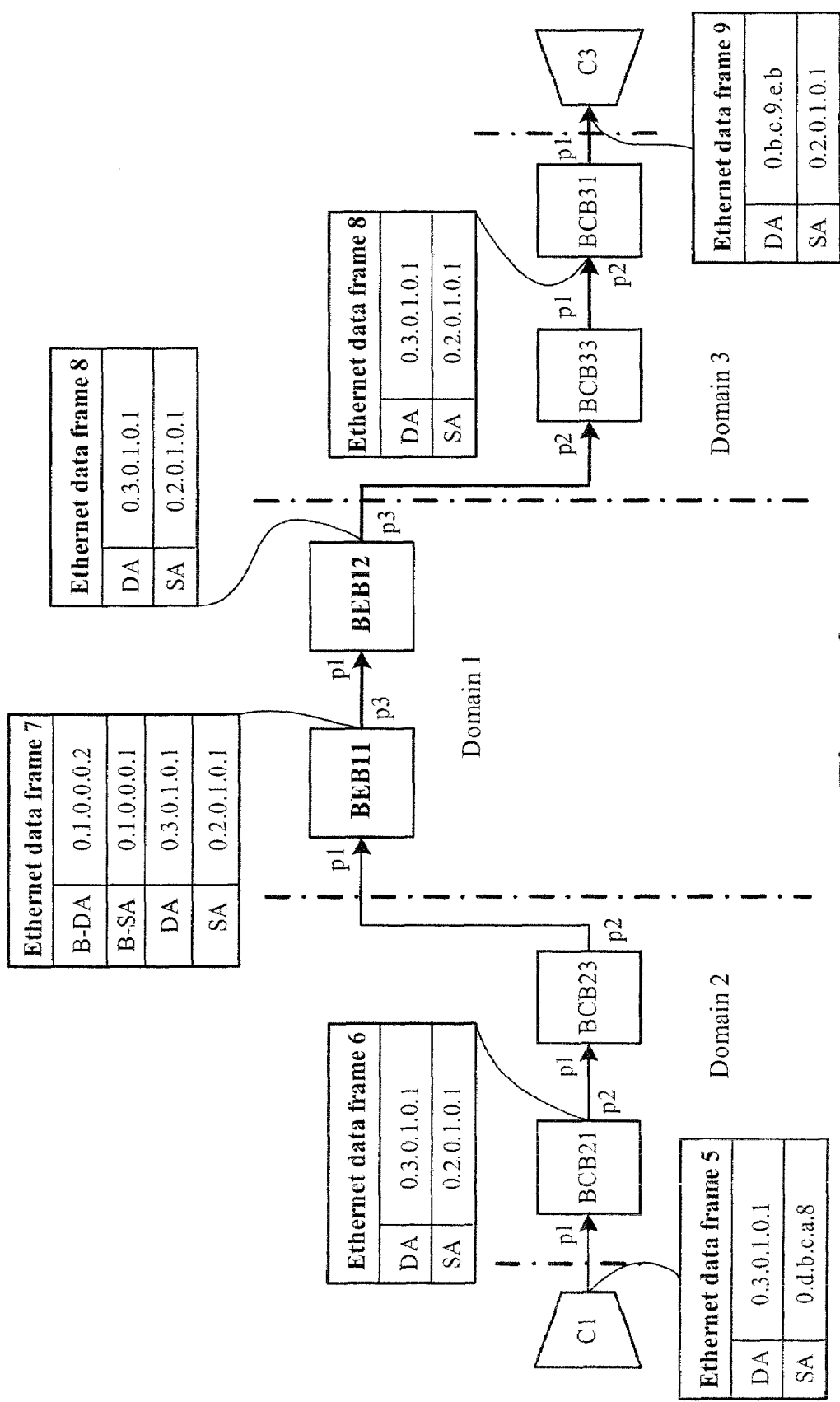
FIG. 6 is a schematic diagram illustrating the process of processing data frame sent by C1 to C3 in the Ethernet network shown in FIG. 4.

At this point, C1 may send a unicast Ethernet data frame 5 to C3. The destination MAC address of the unicast Ethernet data frame 5 is the hierarchical MAC address (0.3.0.0.1) of C3 converted by BCB31, and the source MAC address in the unicast Ethernet data frame 5 is a conventional MAC address (0.d.b.c.a.8) of C1. FIG. 6 is a schematic diagram illustrating the process of forwarding the Ethernet data frame. As shown in FIG. 6, the process is described below.

Upon receiving through port p1 the unicast Ethernet data frame 5 sent by C1, BCB21 replaces the conventional source MAC address in the unicast Ethernet data frame 5 by the hierarchical MAC address 0.2.0.1.0.1 according to the allocation resources configured in advance, thereby a new Ethernet data frame 6 is established and a reverse MAC mapping table [0.2.0.1.0.1, 0.d.b.c.a.8] is also established as shown in Table 18.

TABLE 18

BCB21 Reverse MAC Mapping Table

| Hierarchical Destination MAC Address | Converted Conventional MAC Address |
|---|---|
| 0.2.0.1.0.1 | 0.d.b.c.a.8 |

BCB21 learns the hierarchical source MAC address of the Ethernet data frame 6 based on the BCB21 MAC learning matching table. Because the first 16 bits of 0.2.0.1.0.1 matches best with the learning matching entry [0.2.0.0.0.0, 48], the forwarding matching mask is 48 bits, and thus a forwarding matching entry [0.2.0.1.0.1, 48, p1] is generated in the MAC forwarding matching table. BCB21 searches the BCB21 MAC forwarding matching table, finds that the destination MAC address 0.3.0.1.0.1 matches best with a forwarding matching entry [0.3.0.0.0.0, 16, p2], and sends the Ethernet data frame 6 through port p2.

BCB23 learns the hierarchical source MAC address of the Ethernet data frame 6 based on the BCB23 MAC learning matching table. Because the first 16 bits of 0.2.0.1.0.1 matches best with the learning matching entry [0.2.0.0.0.0, 32] the forwarding matching mask is 32 bits, and thus a forwarding matching entry [0.2.0.1.0.0, 32, p1] is generated in the MAC forwarding matching table. Then BCB23 searches the BCB23 MAC forwarding matching table, finds that the destination MAC address 0.3.0.1.0.1 matches best with [0.3.0.0.0.0, 16, p2], and sends the Ethernet data frame 6 through port p2.

BEB11 learns the hierarchical source MAC address based on the BEB11 MAC learning matching table upon receiving the Ethernet data frame 6 through port p1. Hierarchical source MAC address 0.2.0.1.0.1 matches with the default and the forwarding matching mask is 16 bits, thus a forwarding matching entry [0.2.0.0.0.0, 16, N/A, p1] is generated in the MAC forwarding matching table. The destination MAC address 0.3.0.1.0.1 matches best with [0.3.0.0.0.0, 16, 0.1.0.0.0.2, p3]. The MAC in MAC frame header is added to the Ethernet data frame 6 which then turns to an Ethernet data frame 7, and the Ethernet data frame 7 is sent through port p3.

BEB12 learns the hierarchical source MAC address based on the BEB12 MAC learning matching table upon receiving the Ethernet data frame 7 through port p1. Hierarchical source MAC address 0.2.0.1.0.1 matches with the default and the forwarding matching mask is 16 bits, thus a forwarding matching entry [0.2.0.0.0.0, 16, 0.1.0.0.0.1, p1] is generated in the MAC forwarding matching table. The destination MAC address 0.3.0.1.0.1 matches best with [0.3.0.0.0.0, 16, N/A, p3], then the MAC in MAC frame header is removed from the Ethernet data frame 7 and an Ethernet data frame 8 is generated and sent through port p3.

BCB33 learns the hierarchical source MAC address based on the BCB33 MAC learning matching table upon receiving the Ethernet data frame 8 through port p2. Hierarchical source MAC address 0.2.0.1.0.1 matches with the default, thus the forwarding matching mask is 16 bits, and a forwarding matching entry [0.2.0.0.0.0, 16, p2] is generated in the MAC forwarding matching table. Then BCB33 searches the BCB33 MAC forwarding matching table, finds that the hierarchical destination MAC address 0.3.0.1.0.1 matches best with [0.3.0.1.0.0, 32, p1], and sends the Ethernet data frame 8 through port p1.

BCB31 learns the hierarchical source MAC address based on the BCB31 MAC learning matching table upon receiving the Ethernet data frame 8 through port p2. Hierarchical source MAC address 0.2.0.1.0.1 matches with the default, thus the forwarding matching mask is 16 bits, and a forwarding matching entry [0.2.0.0.0.0, 16, p2] is generated in the MAC forwarding matching table. Then BCB31 searches the BCB31 MAC forwarding matching table, finds that the destination MAC address 0.3.0.1.0.1 matches best with [0.3.0.1.0.1, 48, p1]. BCB31 converts the destination address to 0.b.c.9.e.b according to the reverse MAC mapping table [0.3.0.1.0.1, 0.b.c.9.e.b], generates an Ethernet data frame 9, and sends the Ethernet data frame 9 through port p1.

Through the processes above, the MAC forwarding matching tables generated by bridges BEB11, BEB12, BCB21, BCB23, BCB31 and BCB33 are shown in Table 19, Table 20, Table 21, Table 22, Table 23 and Table 24 respectively.

TABLE 19

BEB11 MAC Forwarding Matching Table

| Hierarchical Destination MAC Address | Length of the Forwarding Mask (bits) | Destination B-MAC | Egress-port Identifier |
|---|---|---|---|
| 0.2.0.0.0.0 | 16 | N/A | p1 |
| 0.3.0.0.0.0 | 16 | 0.1.0.0.0.2 | p3 |

TABLE 20

BEB12 MAC Forwarding Matching Table

| Hierarchical Destination MAC Address | Length of the Forwarding Mask (bits) | Destination B-MAC | Egress-port Identifier |
|---|---|---|---|
| 0.2.0.0.0.0 | 16 | 0.1.0.0.0.1 | p1 |
| 0.3.0.0.0.0 | 16 | N/A | p3 |

TABLE 21

BCB21 MAC Forwarding Matching Table

| Hierarchical Destination MAC Address | Length of the Forwarding Mask (bits) | Egress-port Identifier |
|---|---|---|
| 0.3.0.0.0.0 | 16 | p2 |
| 0.2.0.1.0.1 | 48 | p1 |

TABLE 22

BCB23 MAC Forwarding Matching Table

| Hierarchical Destination MAC Address | Length of the Forwarding Mask (bits) | Egress-port Identifier |
|---|---|---|
| 0.2.0.1.0.1 | 32 | p1 |
| 0.3.0.0.0.0 | 16 | p2 |

TABLE 23

BCB31 MAC Forwarding Matching Table

| Hierarchical Destination MAC Address | Length of the Forwarding Mask (bits) | Egress-port Identifier |
|---|---|---|
| 0.3.0.1.0.1 | 48 | p1 |
| 0.2.0.0.0.0 | 16 | p2 |

TABLE 24

BCB33 MAC Forwarding Matching Table

| Hierarchical Destination MAC Address | Length of the Forwarding Mask (bits) | Egress-port Identifier |
|---|---|---|
| 0.3.0.1.0.0 | 32 | p1 |
| 0.2.0.0.0.0 | 16 | p2 |

According to the method above in accordance with the embodiments of the invention, an embodiment of the invention provides an Ethernet network. As shown in FIG. 4, the Ethernet network includes multiple network domains each of which has a domain address and includes one or more in-domain bridges having an in-domain bridge address. The CE or other networks are connected to the Ethernet network through an in-domain bridge of the Ethernet network. Each CE or each of the other networks has a hierarchical MAC address including the domain address where the CE or the other network belongs, the bridge address corresponding to the in-domain bridge connected to the CE or the network, and a client address for differentiating different CE or networks.

The Ethernet network is divided into multiple network domains, a domain address is allocated for each network domain including one or more in-domain bridges, and an in-domain bridge address is allocated for each in-domain bridge. Hierarchical MAC addresses are allocated for other networks or CE connected to the in-domain bridges. A hierarchical MAC address includes a domain address corresponding to the domain where the CE or network belongs, a bridge address corresponding to the in-domain bridge connected to the CE or network, and a client address for differentiating different CE or networks. Upon receiving an Ethernet data frame, the bridge, according to the length of the learning mask designated to the bridge and the MAC learning matching table configured for the bridge, learns the hierarchical source MAC address contained in the Ethernet data frame, acquires the length of the forwarding mask, generates and stores a forwarding matching entry in the MAC forwarding matching table of the bridge.

Figure 7:
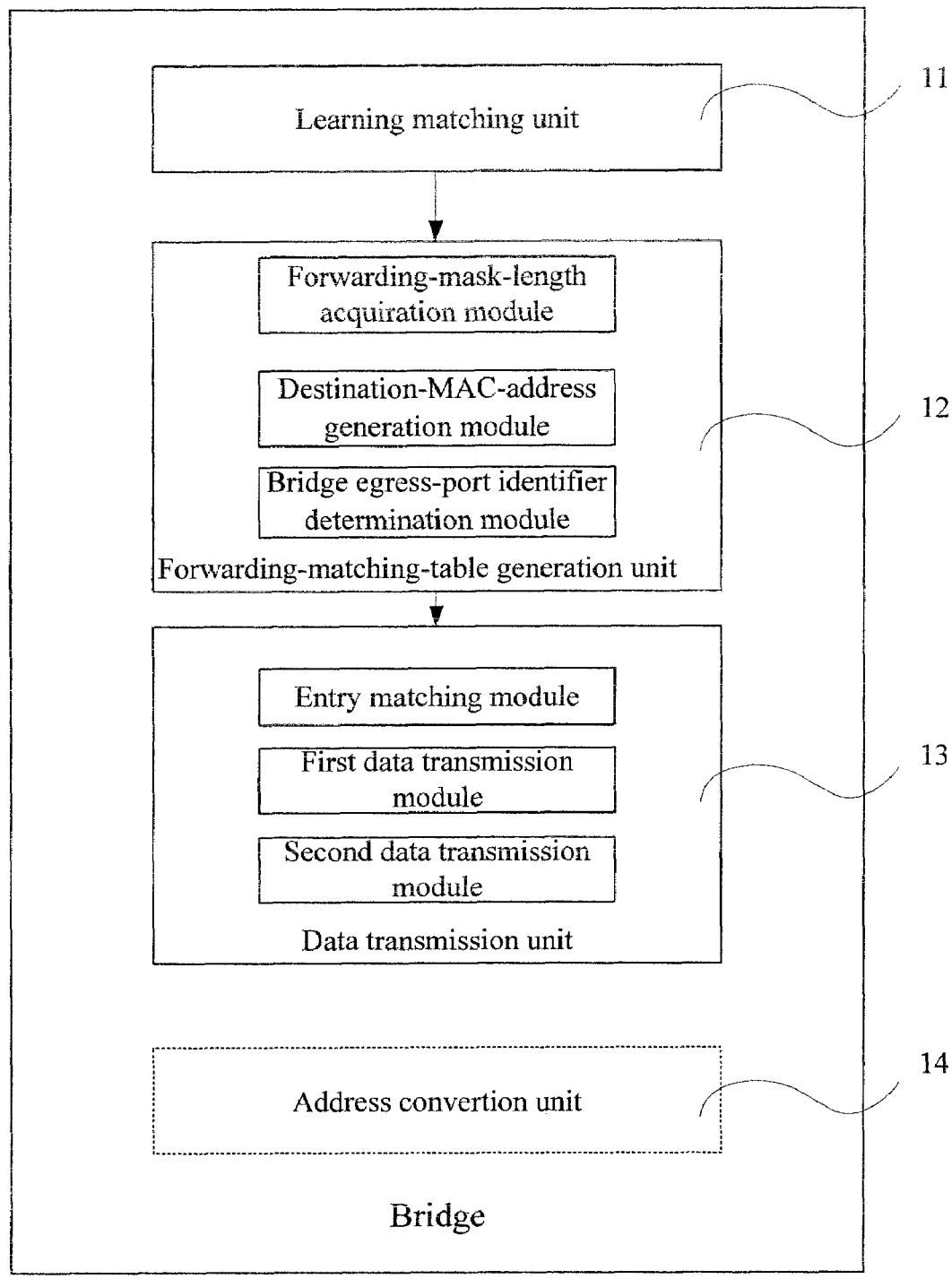
FIG. 7 is a schematic diagram illustrating the structure of a bridge function module in the Ethernet network in accordance with an embodiment of the invention.

FIG. 7 is a schematic diagram illustrating the structure of a bridge. As shown in FIG. 7, the bridge may include a earning matching unit 11 for storing a MAC learning matching table, and a forwarding-matching-table generation unit 12. The bridge may further include a data transmission unit 13.

When the bridge receives an Ethernet data frame, the learning matching unit 11 learns, according to the length of a learning mask designated by the bridge and the MAC learning matching table, a hierarchical source MAC address contained in the Ethernet data frame, and acquires an entry in the MAC learning matching table corresponding to the hierarchical source MAC address contained in the Ethernet data frame.

The forwarding-matching-table generation unit 12 generates a forwarding matching entry according to the hierarchical source MAC address contained in the Ethernet data frame, the length of the forwarding mask acquired from the entry in the MAC learning matching table and the bridge port through which the Ethernet data frame is received; and saves the forwarding matching entry in the MAC forwarding matching table of the bridge.

The data transmission unit 13 searches the MAC forwarding matching table stored locally for a forwarding matching entry matching with the hierarchical destination MAC address contained in the Ethernet data frame. If the matching forwarding matching entry is found, the data transmission unit 13 sends the Ethernet data frame through the port indicated in the forwarding matching entry. Otherwise, the data transmission unit 13 broadcasts the Ethernet data frame received to other bridges and CE connected to the bridge.

The bridge of the client side connected to the CE further includes an address conversion unit 14. The address conversion unit 14 firstly converts the conventional MAC address contained in the Ethernet data frame to a corresponding hierarchical MAC address when the bridge of the client side receives the Ethernet data frame of the Ethernet sent by the CE.

The forwarding-matching-table generation unit 12 includes a forwarding-mask-length acquisition module, a destination-MAC-address generation module, and a bridge-egress-port identifier determination module.

The forwarding-mask-length acquisition module acquires the length of the forwarding mask corresponding to the hierarchical source MAC address from the entry in the MAC learning matching table acquired by the learning matching unit 11.

The destination-MAC-address generation module sets the higher order bits of the source MAC address of the Ethernet data frame, the length of which is equal to the length of the forwarding mask, as the higher order bits of the hierarchical destination MAC address in the MAC forwarding matching table; and sets other lower order bits of the hierarchical destination MAC address as 0.

The bridge-egress-port identifier determination module sets the port identifier corresponding to the port through which the Ethernet data frame is received as the bridge-egress-port identifier in the MAC forwarding matching table.

The data transmission unit 13 includes an entry matching module, a first data transmission module, and a second data transmission module.

The entry matching module acquires the higher order bits of the hierarchical destination MAC address in the MAC forwarding matching table, the length of the address bytes is equal to the length of the forwarding mask corresponding to the hierarchical destination MAC address in the MAC forwarding matching table; and compares the address bytes acquired with those of the hierarchical destination MAC address contained in the Ethernet data frame. If they are the same, in other words if a matching entry is found in the MAC forwarding matching table, the entry matching module sends a success message to the first data transmission module. If no matching entry in the MAC forwarding matching table is found, the entry matching module sends a failure message to the second data transmission module.

The first data transmission module sends the Ethernet data frame to other bridges or destination CE through the bridge egress port recorded in the matching entry. Or the second data transmission module broadcasts the Ethernet data frame to other bridges and CE connected to the bridge.

To sum up, according to the embodiments of the invention, the number of entries included in the MAC forwarding matching table of a bridge is reduced effectively, that is, the scale of the MAC forwarding matching table of the bridge is reduced.

Combined with the MAC in MAC technique in the prior art, the technical scheme of the invention may further reduce the scale of the MAC forwarding matching table of a BEB.

Those skilled in the art may make numerous changes and variations on the technical scheme of the invention without departing from the spirit and scope thereof. Accordingly, it is intended that the invention includes the changes and variations in case that such changes and variations come within the scope as set forth in the appended claims and the equivalent techniques thereof.

What is claimed is:

1. A method for Ethernet data frame learning, comprising:
receiving, by a bridge through a bridge port of a domain of an Ethernet network divided into multiple domains, an Ethernet data frame including a source Media Access Control (MAC) address; and
generating a forwarding matching entry including a destination MAC address, length of a forwarding mask and a bridge egress-port identifier through:
acquiring the length of the forwarding mask by matching, according to a length of a learning mask, the source MAC address included in the Ethernet data frame with a MAC learning matching table comprising the source MAC address and the length of the forwarding mask;
generating the forwarding matching entry, according to the source MAC address and the length, of the forwarding mask; and
saving the forwarding matching entry, in a MAC forwarding matching table,
wherein the destination MAC address is acquired by matching the source MAC address with the length of the forwarding mask.

2. The method of claim 1, wherein the length of the learning mask is designated to a bridge in the domain of the Ethernet network according to context of the bridge; and
the MAC learning matching table comprises the source MAC address and the length of the forwarding mask.

3. The method of claim 2, wherein the source MAC address in the MAC learning matching table is set as default.

4. The method of claim 1, wherein the MAC learning matching table comprises the source MAC address, the length of the learning mask and the length of the forwarding mask.

5. The method of claim 1, wherein the acquiring the length of the forwarding mask comprises:
matching the source MAC address contained in the Ethernet data frame with the MAC learning matching table based on the length of the learning mask;
acquiring an entry in the MAC learning matching table that matches with the source MAC address contained in the Ethernet data frame; and
acquiring the length of the forwarding mask from the matching entry.

6. The method of claim 1, wherein the generating the forwarding matching entry comprises:
setting higher order bits of the destination MAC address in the forwarding matching entry as higher order bits of the source MAC address contained in the Ethernet data frame, wherein the length of the higher order bits is equal to the length of the forwarding mask;
setting other lower order bits of the destination MAC address in the forwarding matching entry as 0; and
selling an identifier of the bridge port through which the Ethernet data frame is received as the bridge egress-port identifier in the forwarding matching entry.

7. The method of claim 1, further comprising:
forwarding the Ethernet data frame according to the MAC forwarding matching table.

8. The method of claim 1, wherein the bridge port in the domain of the Ethernet network is a port of a client-side bridge connected to client equipment, and the Ethernet data frame is sent by the client equipment and includes a conventional source MAC address of the client equipment;
the method further comprises:
converting the conventional source MAC address to the source MAC address;
generating a reverse MAC mapping table including the conventional MAC address and a destination MAC address set as the source MAC address.

9. The method of claim 1, further comprising:
acquiring the forwarding matching entry from the MAC forwarding matching table corresponding to the destination MAC address contained in the Ethernet data frame, wherein the forwarding matching entry includes the destination MAC address, length of a forwarding mask, and the bridge egress-port identifier; and
forwarding the Ethernet data frame through a bridge egress port indicated in the forwarding matching entry.

10. The method of claim 9, wherein the destination MAC address contained in the Ethernet data frame comprises at least a domain address and a client address;
the acquiring a forwarding matching entry from the MAC forwarding matching table comprises:
determining whether higher order bits of the destination MAC address contained in the Ethernet data frame are the same as higher order bits of the destination MAC address of the forwarding matching entry in the MAC forwarding matching table, wherein the length of the higher order bits is equal to the length of the forwarding mask; and acquiring the forwarding matching entry if same;
the forwarding the Ethernet data frame comprises:
forwarding the Ethernet data frame through the bridge egress port according to the bridge egress-port identifier in the forwarding matching entry acquired.

11. The method of claim 9, wherein the bridge port is a port of a client-side bridge connected to client equipment, and the Ethernet data frame is sent by the client equipment and further includes a conventional source MAC address of the client equipment;
the method further comprises:
converting the conventional source MAC address to the source MAC address, wherein the source MAC address comprises at least a domain address and a client address; and
generating a reverse MAC mapping table including the conventional MAC address and the destination MAC address set as the source MAC address.

12. The method of claim 9, wherein the multiple domains of the Ethernet network use a technique of MAC stack.

13. The method of claim 9, wherein the destination MAC address contained in the Ethernet data frame is a unicast MAC address and the length of the destination MAC address contained in the Ethernet data frame is 48 bits.

14. An Ethernet network, comprising multiple domains; wherein
each of the multiple domains includes at least one bridge through which client equipment or other networks are connected to the Ethernet network, and the at least one bridge is configured to:
receive, by the at least one bridge through a bridge port of a domain of the Ethernet network, an Ethernet data frame containing a source MAC address; and
generate a forwarding matching entry including a destination MAC address, length of a forwarding mask and a bridge egress-port identifier through:
acquiring, the length of the forwarding mask by matching, according to a length of a learning mask, the source MAC address included in the Ethernet data frame with a MAC learning, matching table comprising the source MAC address and the length of the forwarding mask;
generating the forwarding matching entry according to the source MAC address and the length of the forwarding mask; and
saving the forwarding matching entry in a MAC forwarding matching table,
where the destination MAC address is acquired by matching the source MAC address with the length of the forwarding mask.

15. The Ethernet network of claim 14, wherein the at least one bridge is further configured to forward the Ethernet data frame according to the MAC forwarding matching table stored in the at least one bridge.

16. A bridge in a domain of an Ethernet network including multiple domains, comprising one or more components configured to:
receive, by the bridge through a bridge port of the bridge, an Ethernet data frame containing a source MAC address; and
generate a forwarding matching entry including a destination MAC address, length of a forwarding mask and a bridge egress-port identifier through:
acquiring, the length of the forwarding mask by matching, according to a length of a learning mask, the source MAC address included in the Ethernet data frame with a MAC learning, matching table comprising the source MAC address and the length of the forwarding mask;

generating the forwarding matching entry according to the source MAC address and the length of the forwarding mask; and saving the forwarding matching entry in a MAC forwarding matching table, where the destination MAC address is acquired by matching the source MAC address with the length of the forwarding mask.

17. The bridge of claim 16, wherein the source MAC address comprises at least a domain address and a client address; and the one or more components comprise:

a learning matching unit, for storing a MAC learning matching table at least including the length of the forwarding mask and the source MAC address, learning, according to the length of the learning mask and the MAC learning matching table, the source MAC address contained in the Ethernet data frame and acquiring an entry in the MAC learning matching table corresponding to the source MAC address contained in the Ethernet data frame; and a forwarding-matching-table generation unit, for generating the forwarding matching entry according to the source MAC address contained in the Ethernet data frame and the length of the forwarding mask acquired from the entry in the MAC learning matching table, and saving the forwarding matching entry in a MAC forwarding matching table.

18. The bridge of claim 17, further comprising: a data transmission unit, for forwarding the Ethernet data frame according to the MAC forwarding matching table.

19. The bridge of claim 17, wherein the forwarding-matching-table generation unit comprises:

a forwarding-mask-length acquisition module, for acquiring the length of the forwarding mask from the entry in the MAC learning matching table acquired by the learning matching unit;

a destination-MAC-address generation module, for setting higher order bits of the destination MAC address of the forwarding matching entry in the MAC forwarding matching table as higher order bits of the source MAC address contained in the Ethernet data frame, wherein the length of the higher order bits is equal to the length of the forwarding mask, and setting other lower order bits of the destination MAC address of the forwarding matching entry in the MAC forwarding matching table as 0; and a bridge-egress-port-identifier determination module, for setting the identifier of the bridge port through which the Ethernet data frame is received as the bridge egress-port identifier of the forwarding matching entry in the MAC forwarding matching table.

20. The bridge of claim 18, wherein the data transmission unit comprises:

an entry matching module, for determining whether the higher order bits of the destination MAC address of the forwarding matching entry in the MAC forwarding matching table are same as the higher order bits of the destination MAC address contained in the Ethernet data frame, wherein the length of the higher order bits is equal to the length of the forwarding mask; acquiring the forwarding matching entry and sending a success message if same; and sending a failure message if not same;

a first data transmission module, for sending the Ethernet data frame to other bridges or destination client equipment through a bridge egress port indicated in the forwarding matching entry according to the success message; and a second data transmission module, for broadcasting the Ethernet data frame to other bridges and client equipment connected to the bridge according to the failure message.

21. The bridge of claim 17, further comprising:

an address conversion unit, for converting a conventional source MAC address contained in the Ethernet data frame sent by client equipment into the source MAC address when the bridge is a client-side bridge connected to the client equipment.

* * * * *